Nov. 2, 1965    R. P. COLLINS ETAL    3,215,829
ILLUMINATION DEVICE
Filed April 2, 1962

INVENTORS.
ROBERT PAUL COLLINS
BY DONALD EUGENE LEE

Henry William Kaufmann
AGENT

United States Patent Office 3,215,829
Patented Nov. 2, 1965

3,215,829
ILLUMINATION DEVICE
Robert P. Collins, Collingdale, and Donald E. Lee, Abington, Pa., assignors to General Electric Company, a corporation of New York
Filed Apr. 2, 1962, Ser. No. 184,428
2 Claims. (Cl. 240—41.35)

This invention pertains to the art of illumination and more particularly to the art of concentrating radiation from a source upon a selected portion of a relatively remote surface or plane.

In conventional projection systems, light diverging from a source is concentrated upon a surface of interest, such as a film gate, by some means which changes the direction of at least some of the light rays to concentrate the light. These devices are frequently refracting, as exemplified by the conventional condensing lens, which is often rather poorly corrected but has a relatively large aperture. It is common to combine, with the use of such condensing lenses, reflectors which direct toward the condensing lens the light emitted toward the rear of the source. This type of design is conveniently applicable to a frequency range of about an octave or from roughly 4,000 to 8,000 Angstroms, covering the visible portion of the spectrum. However, there are some applications (specifically the simulation of solar radiation unmodified by the earth's atmosphere, as is found in extraterrestrial space) which require a range of some 6 or 7 octaves in radiation frequency. In order to achieve the desired spectral energy distribution, it is desirable to utilize completely closed gas-discharge lamps which, being concentrated sources, develop a fairly large amount of localized heat. The wide frequency range to be transmitted renders the use of conventional refractive systems difficult because even those few materials which are reasonably transmissive over the frequency spectrum of interest are not constant in refractive index over this frequency range, so that to produce a wide aperture condensing lens with even the usual aberrations of the conventional optical condensers would be very difficult.

In order to produce a sufficient total energy of radiation to simulate solar radiation over a large area, it is necessary to employ a number of gas discharge lamps side by side. This creates the requirement that the condensing or concentrating system for each lamp should not extend too far equatorially around the source in order that it may not interfere with the similar parts of the neighboring source. Also, it must not extend too far normal to the equatorial plane because then it might shadow the radiation from a neighboring source. Furthermore, the large amount of heat generated in the gas tube lamps during operation renders it undesirable that the optical system should enclose the lamp to an extent which would impede ventilation. Such a condensing system may preferably be reflective because of the objects above given to refractive systems for this purpose.

In order to achieve reasonably high efficiency, the reflector system should subtend a fairly large fraction of the $4\pi$ steradians around the lamp and yet, for the particular application involved, it must furnish a beam of radiation concentrated over a very small area, which is the entrance aperture of an optical system to be illuminated. It is also desired that the illumination of the aperture conform closely to a prescribed distribution, since the sun's radiation in space is quite uniform over fairly large areas and it is this which it is desired to simulate, by the optical system of which the aperture is a portion.

We have invented a novel combination of reflectors which achieves the various objects outlined in the preceding and is relatively inexpensive, rugged and simple.

For the better explanation and understanding of our invention, we have provided figures of drawing, as follows.

Figure 1:
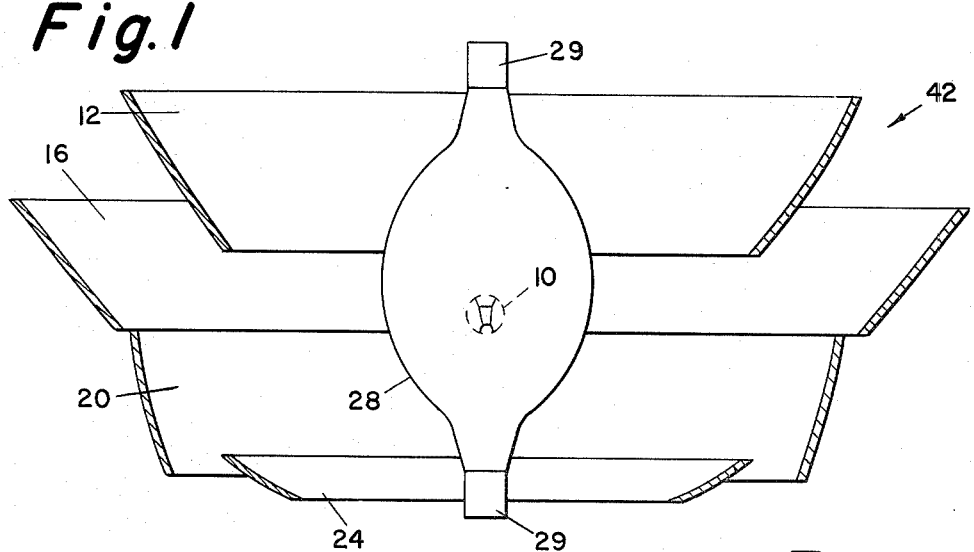
FIG. 1 represents in section a basic embodiment of our invention showing a light source and various reflector elements.

Referring to FIG. 1, there is represented a radiation source 10 which is located centrally with respect to the reflector elements, and a first reflector 12 which is an ellipsoid of revolution one of whose foci is located at source 10. Below it in the figure is another ellipsoidal reflector 16, which is of such geometry that it has a focus also located at source 10. It will be observed that the dimensions of reflector 12 and reflector 16 are such that radiation from source 10 may be reflected from each reflector, 12 and 16, focussed and directed upward without a discontinuity between the two light beams, and without shadowing, by reflector 12, of the radiation reflected from reflector 16. The reflector denoted 20 is so located, below the equatorial plane of the source 10, that if it reflected radiation directly upward (in the drawing) such radiation would impinge on reflector 12 and indeed, so far as the view toward the upper portion of FIG. 1 is concerned, reflector 20 is completely shadowed by reflector 12; their areas, projected on the equatorial plane, overlap. However, reflector 20 subtends an appreciable solid angle around source 10, and it is desirable that the radiation emitted over this angle be not wasted. If it were desired to employ reflector 20 in the same fashion as reflectors 12 and 16, it would be necessary either that it be made of larger diameter than reflector 16, or of smaller diameter than reflector 24. (Reflector 24 is similar to reflectors 12 and 16, being a portion of an elipsoid whose focus is located at 10, and being sufficiently small in diameter so that it reflects an upward-directed beam just inside the aperture in reflector 12, with no shadowing by reflector 12 and with no appreciable gap between the beams from reflectors 12 and 24.) To extend reflector 20 beyond the outer diameter of reflector 16 would make the assembly objectionably large, and cause interference wtih adjacent similar assemblies. To make it smaller than the internal diameter of reflector 24 would impair ventilation and would also create somewhat of a problem in that the reflector surface itself would be raised to a rather high temperature with possible deleterious effects. Reflector 20 is thus actually made as a portion of a sphere having it center located at source 10. Reflector 20 subtends below the equatorial plane just about as much latitude as do reflectors 12 and 16 above the equatorial plane. Therefore, the radiation reflected from reflector 20 passes through source 10 and impinges on reflectors 12 and 16 in substantially the same geometrical relationship as radiation coming directly from source 10 to reflectors 12 and 16.

It is thus evident from the preceding description that FIG. 1 represents a reflector assembly which utilizes the radiation over a fairly large solid angle around source 10, which occupies a relatively small area equatorially and is at the same time not excessively high. Furthermore, no portion of the reflecting system is brought extremely close to source 10, and the minimum throat for ventilation is the internal diameter of reflector 24. The source 10 is actually an arc of small but finite size located inside a lamp bulb 28 which is equipped with terminals 29. Since the various reflectors 12, 16, and 24 are ellipsoids, radiation reflected from them will in fact be focussed toward the second focus of each. However, as is described in greater detail hereinafter in the second paragraph succeeding this paragraph, the major axis of the ellipsoid of each such reflector is a number of times the diameter of each such reflector, so that the second focus is several diameters distant. In consequence, light reflected by the reflector from its first focus to its second is *approximately* normal to the equatorial plane of the light source.

Figure 1A:
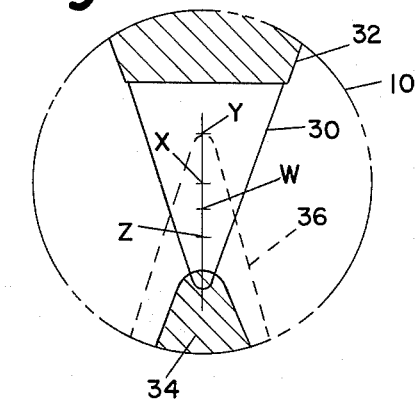
FIG. 1A represents a detail of FIG. 1.

FIG. 1A represents source 10 in detail. The arc 30 is is represented by solid lines extending to form an approximate trapezoid between anode 32 and cathode 34. Since the arc is actually approximately 7 mm. long, corresponding to the distance between anode 32 and cathode 34, the different reflectors are so oriented that their foci are located at different points along the axis of arc 30. The focus of reflector 12 is located at the point represented by Y. The focus of reflector 16 is located at the point marked Z. The focus of reflector 24 is located at the point marked X. Reflector 20 has its center located at the point marked W and produces a reflected image of arc 30 which is inverted and is represented by the dash line 36.

Figure 2:
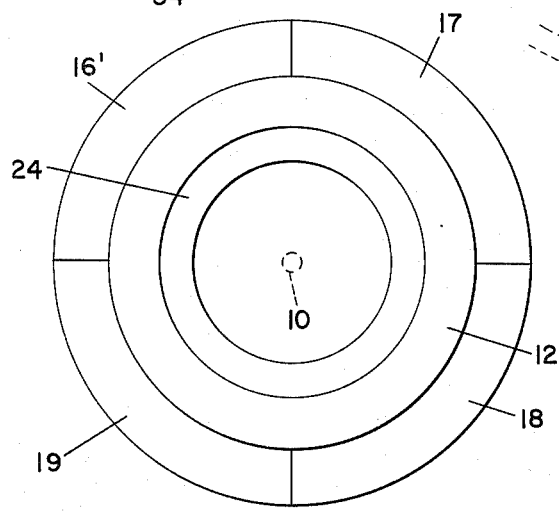
FIG. 2 represents in plan a sophisticated embodiment of our invention in which the basic elements represented in FIG. 1 are further subdivided in order to permit a more exact adjustment of the light pattern and the density of illumination as produced by our invention.

For the particular application for which our invention was originally intended, it chanced that the aperture to be illuminated was not a rectangle nor a circle, but a quadrant of a circle of 10-inch radius. Because of the unsymmetrical illumination pattern desired, it was desirable to permit adjustment of various portions of the reflecting system separately. This is represented in FIG. 2, which is a view in plan of elements similar to these represented in FIG. 1. The principal exception to this is the subdivision of reflector 16 of FIG. 1 into quadrants designated, respectively, 16', 17, 18 and 19. Reflector 20 is, of course, not visible in FIG. 2 because it is completely concealed by reflector 12. The various elements of FIG. 2 are slightly displaced from the completely symmetrical arrangement with respect to the optical axis which is represented in FIG. 1. However, these displacements are too small to be represented with accuracy in a drawing and they are therefore summarized here. Reflector 12 still remains located symmetrically with respect to the optical axis of the system. In the particular embodiment which was actually constructed, it had an outer diameter of 11.6 inches and an inner diameter of 8.4 inches. The equation for the ellipse describing the generating curve of the reflector (by rotation around the optical axis) is:

$$\frac{x^2}{(90.728)^2}+\frac{y^2}{(17.625)^2}=1$$

Its focus is 6 mm. above the base of the arc or, as represented in FIG. 1A, at point Y. Reflectors 16', 17, 18 and 19 are quadrants formed by sectioning at 90° intervals a reflector whose outer diameter is 15 inches and inner diameter 11.6 inches and whose generating ellipse is given by the equation:

$$\frac{x^2}{(92.049)^2}+\frac{y^2}{(23.495)^2}=1$$

However, quadrants 16' and 18 are tilted by an angle of 1.6° away from the direction which is upward in FIG. 1, the rotation taking place around the focus of the reflectors; and reflectors 17 and 19 are tilted in the same direction but by an angle of 1.93°. It will be appreciated that to represent these small angles accurately and in particular to represent the difference between an angle of 1.6° and one of 1.93° would be extremely difficult. Reflector 20 is a zone of a sphere and has an outer diameter of 11.6 inches and an inner diameter of 8.4 inches. It is located symmetrically with respect to the axis of the system, like reflector 12. Reflector 24 is an ellipsoid having an outer diameter of 8.4 inches and an inner diameter of 6 inches. The equation for the ellipse which determines its surface is:

$$\frac{x^2}{(92.464)^2}+\frac{y^2}{(25.073)^2}=1$$

Its focus is 4 mm. above the base of the arc or at point X as represented in FIG. 1A. Its optical axis is tilted with respect to the optical axis of the system by a very small angle whose tangent is 1/178. This particular combination of displacements has the effect of producing the required illumination over the target area—i.e., the optical aperture which it is desired to illuminate.

Figure 3:
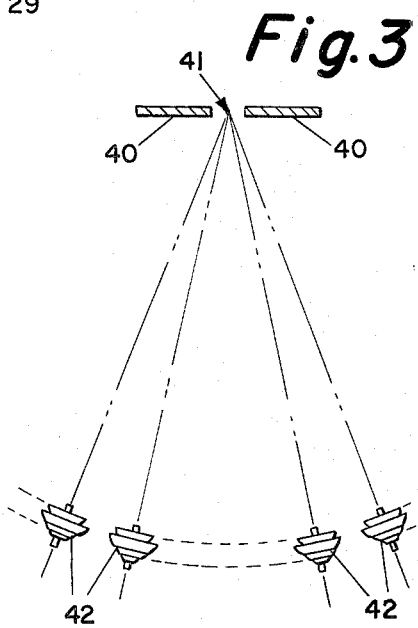
FIG. 3 represents a plurality of the embodiments of the embodiments of FIG. 2 arranged to illuminate an aperture.

FIG. 3 represents generally the manner of using a plurality of these reflectors side by side. A mask or stop 40 having an aperture 41 is represented at the top of the figure, and toward the bottom of the figure there are represented a plurality of lamp and reflector combinations designated 42 and located on a circle whose center is in aperture 41 so that all of the assemblies 42 are located substantially the same distance from aperture 41, and they are all so aimed that the light from each lamp, as reflected by the reflector surrounding it, illuminates all of aperture 41. Thus it is evident that, if one or more of the lamps should fail, this would result in a reduction of the total illumination upon the aperture 41 rather than a complete elimination of the illumination of some particular part of the aperture. Since a small variation in the total radiation can be tolerated more readily than nonuniformity, this is a situation to be preferred.

It may be seen even more readily from FIG. 3 than from the preceding figures that the particular design of reflector disclosed here does provide a large amount of open passage, both around and through the lamp reflector systems for the purpose of carrying away by convection the heat developed by the lamp. It is also evident that, since not all of the sources will be located symmetrically with respect to aperture 41, it is desirable to provide for some means of altering slightly the distribution of radiation provided from the various reflecting components. The specific figures given are merely indicative of the nature of adjustments which are possible. For the particular example given, the distance from the arc 30 of source 10 to aperture 41 was approximately 178 inches.

The manner of mechanically supporting the various reflectors and of providing for the small adjustments described is completely conventional. In final designs, it is feasible to combine into one mechanical piece some of the closely associated elements such as reflectors 16 and 20 by providing some bridging connection between the point of least diameter of reflector 16 and that of maximum diameter of reflector 20.

What is claimed is:

1. A source for emitting radiation in various zones around an equatorial plane;
    a first reflector having a reflecting surface in the shape of a zone of an ellipsoid of revolution, with one focus located at the said source, its major axis approximately normal to the said equatorial plane, the said first reflector subtending a zone around the said source on the same side of the equatorial plane as the direction in which radiation from the source is reflected by the said first reflector;
    a second reflector having a reflecting surface in the shape of a zone of an ellipsoid of revolution, with one focus located at the source, its major axis approximately normal to the equatorial plane, the said second reflector subtending a zone around the said source extending between the equatorial plane and the zone subtended by the said first reflector, the said second reflector being so oriented as to reflect radiation from the said source in the same general direction from the equatorial plane as does the said first reflector, and the area of the said second reflector projected on the equatorial plane being outside of and substantially contiguous with the thereon projected area of the said first reflector;

a third reflector having a reflecting surface in the shape of a zone of a sphere, its center located at the said radiation source, the said third reflector subtending a zone around the said source extending from the said equatorial plane of latitude not greater than the sum of the latitudes of the zones subtended by the said first and second reflectors but lying on the opposite side of the equatorial plane, the area of the said reflector projected on the equatorial plane being substantially coincident with the thereon projected areas of the said first reflector;

a fourth reflector having a reflecting surface in the shape of a zone of an ellipsoid of revolution, with one focus located at the said source, its major axis approximately normal to the equatorial plane, oriented so as to reflect radiation from the said source in the same general direction as radiation therefrom reflected by the said first and second reflectors, subtending a zone around the said source extending from the boundary of the zone subtended by the said third reflector in a direction away from the equatorial plane, the area of the said fourth reflector projected on the said equatorial plane lying within and substantially contiguous with the thereon projected area of the said first reflector.

2. A source for emitting radiation in various zones around an equatorial plane;

a first reflector having a reflecting surface in the shape of a zone of an ellipsoid of revolution, with one focus located at the said source, its major axis approximately normal to the said equatorial plane, the said first reflector subtending a zone around the said source on the same side of the equatorial plane as the direction in which radiation from the source is reflected by the said first reflector;

a second reflector comprising four separate quadrants of a zone of an ellipsoid of revolution, the focus of each quadrant being located at the source, the major axis of each quadrant being approximately normal to the said equatorial plane, but the major axes of the quadrants not being exactly parallel to each other, the said second reflector subtending a zone around the said source extending between the equatorial plane and the zone subtended by the said first reflector, the said second reflector being so oriented as to reflect radiation from the said source in the same general direction from the equatorial plane as does the said first reflector, and the envelope of the area of the said second reflector projected on the equatorial plane being outside of and substantially contiguous with the thereon projected area of the said first reflector;

a third reflector having a reflecting surface in the shape of a zone of a sphere, its center located at the said radiation source, the said third reflector subtending a zone around the said source extending from the said equatorial plane, of latitude not greater than the sum of the latitudes of the zones subtended by the said first and second reflectors but lying on the opposite side of the equatorial plane;

a fourth reflector having a reflecting surface in the shape of a zone of an ellipsoid of revolution, with one focus located at the said source, its major axis approximately normal to the equatorial plane, oriented so as to reflect radiation from the said source in the same general direction as radiation therefrom reflected by the said first and second reflectors, subtending a zone around the said source extending from the boundary of the zone subtended by the said third reflector in a direction away from the equatorial plane, the area of the said fourth reflector projected on the said equatorial plane lying within and substantially contiguous with the thereon projected area of the said first reflector.

References Cited by the Examiner

UNITED STATES PATENTS

| | | | |
|---|---|---|---|
| 1,292,637 | 1/19 | Patch | 240—41.35 |
| 1,502,453 | 7/24 | Wood | 240—41.35 |
| 1,864,696 | 6/32 | Steele et al. | 88—24 |
| 3,078,760 | 2/63 | Brownscombe | 88—24 |

FOREIGN PATENTS

| | | |
|---|---|---|
| 383,171 | 12/07 | France. |
| 284,217 | 4/31 | Italy. |

OTHER REFERENCES

German application 1,014,836, printed Aug. 29, 1957 (Kl. 57a 55).

NORTON ANSHER, *Primary Examiner.*

ROBERT EVANS, EVON C. BLUNK, *Examiners.*